United States Patent
Yu et al.

(10) Patent No.: US 9,179,388 B2
(45) Date of Patent: Nov. 3, 2015

(54) METHODS, APPARATUS AND SYSTEM FOR HANDOVER OF UE

(75) Inventors: Vincent Yu, Beijing (CN); Field Liu, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 55 days.

(21) Appl. No.: 13/979,835

(22) PCT Filed: Jan. 25, 2011

(86) PCT No.: PCT/CN2011/000114
§ 371 (c)(1),
(2), (4) Date: Jul. 15, 2013

(87) PCT Pub. No.: WO2012/100367
PCT Pub. Date: Aug. 2, 2012

(65) Prior Publication Data
US 2013/0295931 A1    Nov. 7, 2013

(51) Int. Cl.
*H04W 36/30*    (2009.01)
*H04W 36/32*    (2009.01)

(52) U.S. Cl.
CPC .................................... *H04W 36/32* (2013.01)

(58) Field of Classification Search
None
See application file for complete search history.

(56) References Cited

U.S. PATENT DOCUMENTS

| | | | | |
|---|---|---|---|---|
| 5,548,806 A | * | 8/1996 | Yamaguchi et al. | 455/441 |
| 6,311,065 B1 | * | 10/2001 | Ushiki et al. | 455/440 |
| 6,751,464 B1 | * | 6/2004 | Burg et al. | 455/466 |
| 7,308,015 B2 | * | 12/2007 | Takano et al. | 375/130 |
| 7,693,106 B1 | * | 4/2010 | Ishikawa et al. | 370/331 |
| 7,697,463 B2 | * | 4/2010 | Tanaka | 370/310 |
| 8,488,586 B2 | * | 7/2013 | Centonza et al. | 370/350 |
| 8,718,651 B2 | * | 5/2014 | Gao et al. | 455/439 |
| 8,812,050 B1 | * | 8/2014 | Bencheikh | 455/525 |
| 2001/0050909 A1 | * | 12/2001 | Taketsugu | 370/329 |
| 2002/0048315 A1 | * | 4/2002 | Hanada et al. | 375/145 |

(Continued)

FOREIGN PATENT DOCUMENTS

| CN | 1852562 A | 10/2006 |
|---|---|---|
| CN | 101583169 A | 11/2009 |

(Continued)

OTHER PUBLICATIONS

International Preliminary Report on Patentability, Application No. PCT/CN2011/000114, Jul. 30, 2013, 6 pages.

(Continued)

*Primary Examiner* — Ashish K Thomas
(74) *Attorney, Agent, or Firm* — Nicholson De Vos Webster & Elliott LLP (57) ABSTRACT

The present invention discloses a method for handover of User Equipment (UE) a service connection being made via the UE, comprises: if fast cells are set up as base stations starts up, handover from a normal cell to a first fast cell with a radio bearer set up therein when the UE moving speed exceeds a threshold, set up a same radio bearer at a current fast cell as the radio bearer set up at the first fast cell when the UE is leaving the first fast cell for the current fast cell adjacent to the first fast cell, release the radio bearer at the first fast cell after the UE leaves the first fast cell, and re-registering into an adjacent normal cell when the service connection is terminated, or handover to the adjacent normal cell from the current fast cell when the measured moving speed of the UE is below the threshold.

20 Claims, 5 Drawing Sheets

(56) References Cited

U.S. PATENT DOCUMENTS

| | | | |
|---|---|---|---|
| 2003/0036385 A1* | 2/2003 | Uehara et al. | 455/437 |
| 2003/0181208 A1* | 9/2003 | Lobinger et al. | 455/443 |
| 2006/0116118 A1* | 6/2006 | Charriere et al. | 455/423 |
| 2007/0026887 A1* | 2/2007 | Voyer et al. | 455/525 |
| 2008/0130582 A1* | 6/2008 | Lee et al. | 370/332 |
| 2010/0330995 A1* | 12/2010 | Aoyama et al. | 455/436 |
| 2013/0210443 A1* | 8/2013 | Pedersen et al. | 455/441 |

FOREIGN PATENT DOCUMENTS

| | | |
|---|---|---|
| WO | WO-2008013278 A1 | 1/2008 |
| WO | WO-2009058069 A1 | 5/2009 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification", (Release 8), 3GPP TS 36.331 V8.16.0 (Dec. 2011), 214 pages.

"3rd Generation Partnership Project; Technical Specification Group Radio Access Network; Evolved Universal Terrestrial Radio Access Network (E-UTRAN); S1 Application Protocol (S1AP)", (Release 8), 3GPP TS 36.413 V8.10.0 (Jun. 2010), 217 pages.

"3rd Generation Partnership Project; Technical Specification Group Radio Access Network; Evolved Universal Terrestrial Radio Access Network (E-UTRAN); X2 application protocol (X2AP)", (Release 8), 3GPP TS 36.423 V8.9.0 (Mar. 2010), 100 pages.

"3rd Generation Partnership Project; Technical Specification Group Radio Access Network; Radio Resource Control (RRC); Protocol specification", (Release 8), 3GPP TS 25.331 V8.17.0 (Dec. 2011), 128 pages.

"3rd Generation Partnership Project; Technical Specification Group Radio Access Network; UTRAN lub interface Node B Application Part (NBAP) signalling", (Release 8), 3GPP TS 25.433 V8.12.0 (Jun. 2011), 130 pages.

International Search Report, Application No. PCT/CN2011/000114, Sep. 15, 2011, 2 pages.

"3rd Generation Partnership Project; Technical Specification Group Radio Access Network; UTRAN lub interface Node B Application Part (NBAP) signalling (Release 9)", 3GPP TS 25.433 V9.5.0, (Dec. 2010), pp. 1-108.

* cited by examiner

METHODS, APPARATUS AND SYSTEM FOR HANDOVER OF UE

CROSS-REFERENCE TO RELATED APPLICATIONS

This application is a National stage of International Application No. PCT/CN2011/000114, filed Jan. 25, 2011, which is hereby incorporated by reference.

TECHNICAL FIELD

The present invention relates to wireless communication, in particular, to methods, apparatus and systems for handover of User Equipment (UE).

BACKGROUND

As well known, quality of wireless communication in trains will be affected a lot due to increasing high-speed mobility of trains. High-speed mobility will lead to the following problems for wireless communication.
  UE in service stays in an individual cell for shorter time;
  Doppler shift will increase delay of UE handover so that handover can't be finished in one individual cell;
  Frequently handover will lead to bad user experience.
As a result, how to minimize the bad impact caused by high-speed mobility is very necessary, especially for the handover issues.

Figure 1:
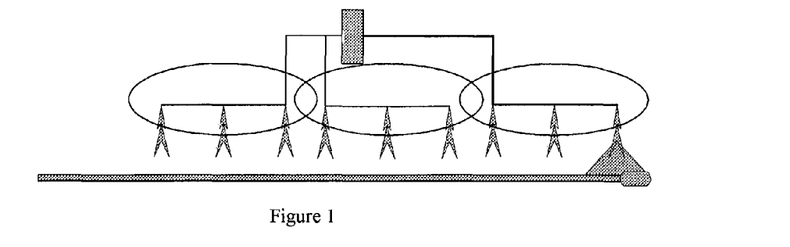
FIG. 1 illustrates a schematic diagram of a solution in prior art.

The existing solution, as shown in FIG. 1, called "large cell solution" to reduce the handover times is that the cells along railways are configured into one specific network (i.e. only serve for the users in the railways) and also increase coverage of one individual cell with remote base station, which may still have the following problems.
  Low capacity. Large cell solution has the same capacity as the normal cell, but its coverage is large. So the average capacity per square meter is relative lower than normal cell.
  Low spectrum efficiency. As well known, spectrum is very significant resource for the Operators. If coverage area of the whole network is certain, the larger the coverage for the whole spectrum is, the lower the spectrum efficiency is.
  Inconvenient for Network Expansion. The configuration of the large cell solution is set at the beginning of the network planning. If expanse of the network is needed, Hardware of base stations has to be reinstalled.

SUMMARY

To this end, the present invention proposes methods of dynamically configuring a cell (named Cell_Fasts, or fast cells) or radio bearers according to moving speed of UE, so as to make the UE feels like it's always in the same cell or with the same radio bearer to avoid high-speed handover.

In one aspect of the invention, a method for handover of User Equipment, UE, in wireless communication network, where a service connection is being made via the UE, is proposed. The method includes: a) handover from a normal cell to a first fast cell with a radio bearer set up therein when measured moving speed of the UE exceeds a threshold; b) setting up a same radio bearer at a current fast cell as the radio bearer set up at the first fast cell when the UE is leaving the first fast cell for the current fast cell adjacent to the first fast cell; c) releasing the radio bearer at the first fast cell after the UE leaves the first fast cell; and d) re-registering into the adjacent normal cell when the service connection is terminated or handover to the adjacent normal cell from the current fast cell when the measured moving speed of the UE is below the threshold; wherein the normal cells and the fast cells are established as network side starts up, the fast cells are cells configured for UEs with the moving speed exceeding the threshold.

In a preferred embodiment of the present invention, the method further includes: setting up the same radio bearer at an adjacent subsequent fast cell as the radio bearer set up at the current fast cell when the UE is moving on from the current fast cell to the adjacent subsequent fast cell and the measured moving speed of the UE exceeds the threshold; and releasing correspondingly the radio bearer at the current fast cell after the UE leaves the current fast cell.

Preferably, consecutive fast cells have a same scrambling code.

Preferably, the fast cells do not allow the UE to register into but handover from/to normal cells. Alternatively, the UE is specified to first register into the normal cell instead of the fast cell.

Preferably, the moving speed of the UE is measured by a base station periodically.

Preferably, the measured moving speed of the UE is reported from the base station (for example, Base Transceiver Station (BTS) or NodeB) to the network controller (for example, Base Station Controller (BSC) or Radio Network Controller (RNC)) via corresponding Abis or Iub interface.

In a second aspect of the invention, a method for handover of User Equipment, UE in wireless communication network, where a service connection is being made via the UE, is proposed. The method includes: a) handover from a normal cell to a first fast cell after the first fast cell and a radio bearer therein are set up when measured moving speed of the UE exceeds a threshold; b) setting up a current fast cell and a radio bearer therein same as the first fast cell when the UE is leaving the first fast cell for the current fast cell adjacent to the first fast cell; c) releasing the radio bearer of the UE in the first fast cell after the UE leaves the first fast cell, and releasing the first fast cell if all the radio bearers are released in the first fast cell; and d) re-registering into the adjacent normal cell when the service connection is terminated or handover to an adjacent normal cell from the current fast cell when the measured moving speed of the UE is below the threshold; wherein, fast cells are cells configured for UEs with the moving speed exceeding a threshold.

In a preferred embodiment of the present invention, the method further includes: setting up a subsequent fast cell and a radio bearer therein same as the current fast cell when the UE is moving on from the current fast cell to the subsequent fast cell and the measured moving speed of the UE exceeds the threshold; and releasing the radio bearer of the UE in the current fast cell after the UE leaves the current fast cell, and releasing the current fast cell if all the radio bearers are released in the current fast cell.

In a third aspect of the invention, a network controller for handover of User Equipment, UE, in wireless communication network, where a service connection is being made via the UE, is proposed. The network controller includes:
  A receiver adapted to receive information of UE moving speed measured; and
  A processor adapted to,
    if fast cells are set up as base stations starts up, instruct to:
      handover from a normal cell to a first fast cell with a radio bearer set up therein when the UE moving speed exceeds a threshold, set up a same radio bearer at a current fast cell as the radio bearer set up at the first fast cell when the UE is leaving the first fast cell for the current fast cell adjacent to the first fast cell, release the radio bearer at the first fast cell after the UE leaves the first fast cell, and re-registering into the adjacent normal cell when the service connection is terminated or handover to an adjacent normal cell from the current fast cell when the moving speed of the UE is below the threshold; and if fast cells are not set up as base stations starts up, the processor adapted to follow the same procedures as above except set up the first or the current fast cell before set up the corresponding radio bearer in the first or the current fast cell, and release the first or the current fast cell after release all the radio bearers in the first or the current fast cell;

Wherein fast cells, including the first fast cell and the current fast cell, are cells configured for UEs with the measured moving speed exceeding the threshold.

In a fourth aspect of the present invention, a base station for handover of User Equipment, UE, in wireless communication network, where a service connection is being made via the UE, is proposed. The base station includes:

A transmitter adapted to measure and transmit information of UE moving speed periodically; and A processor adapted to, if fast cells are set up as base stations starts up, set up a same radio bearer at a current fast cell as the radio bearer set up at a first fast cell when the UE is leaving the first fast cell for the current fast cell adjacent to the first fast cell and the measured moving speed exceeding a threshold, and release the radio bearer at the first fast cell after the UE leaves the first fast cell; and if fast cells are not set up as base stations starts up, the processor adapted to follow the same procedures as above except set up the first or the current fast cell before set up the corresponding radio bearer in the first or the current fast cell, and release the first or the current fast cell after release all the radio bearers in the first or the current fast cell;

Wherein, fast cells, including the current fast cell and the first fast cell, are cells configured for UEs with the moving speed exceeding the threshold.

In a fifth aspect of the present invention, a system for handover of User Equipment, UE, in wireless communication system, includes at least a UE, the network controller and the base station according to the embodiments of the present invention.

This invention is applicable for all kinds of wireless telecommunication systems, such as TD-SCDMA, WCDMA, TDD-LTE, FDD-LTE, and GSM.

According to the embodiments of the present invention, the handover times of UE with a relative high-speed exceeding a threshold is reduced significantly. As a result, quality of wireless communication of UE with the relative high-speed can be better guaranteed and the user will have a better experience in communication since frequent high-speed handover is avoided during UE high-speed moving. Meanwhile, average capacity and spectrum efficiency of per square meter according to the embodiments of the invention are improved. Further, network expansion is convenient since reinstallation of hardware at network side (including base stations) is not necessary, thus improving largely the Operator's investment efficiency.

BRIEF DESCRIPTION OF THE DRAWINGS

The features and advantageous of the present invention will be more apparent from the following exemplary embodiments of the invention illustrated with reference to the accompanied drawings, in which.

DETAILED DESCRIPTION

Embodiments of the present invention will be described more fully hereinafter with reference to the accompanied drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In this disclosure, although terminologies from GSM, WCDMA, TD-SCDMA and 3GPP LTE have been used to exemplify the invention, this should not be seen as limiting the scope of the invention to only the aforementioned system. Other wireless systems may also benefit from exploiting the ideas covered within this disclosure. Given the rapid development in communications, there will of course also be future type wireless communications systems with which the present invention may be embodied.

Due to exist of radio coverage along railways and network planning complexity, we classify the UEs as:

Relative low-speed UE: served by current radio coverage to guarantee quality of calls.

Relative high-speed UE: served by dynamically configured radio bearers or fast cells or preset fast cells according to the high-speed movement of UE, so that the UE feels like always in the same cell or with the same radio bearer, thus the frequent high-speed handover can be avoided.

The relative high-speed in the invention generally refer to a speed exceeding a threshold which is usually determined by operators, such as a speed above 100 km/h, preferably above 160 km/h, or even above 300 km/h, etc. A lot of documents in the prior art have set forth the high-speed concept. For example, it is described in the patent publication No. WO2009058069A1 filed on Jun. 2, 2008 and entitled "SPEED-DEPENDENT ADAPTATION OF MOBILITY PARAMETERS WITH DUAL SPEED MEASUREMENT", the related contents of which are incorporated herein by reference.

The terms "relative high-speed", "high-speed", "high-speed mobility", "relative high-speed mobility", "moving speed exceeding a threshold" etc. in the context of the present invention have the same meaning unless specially stated.

Also, the terms "radio bearer", "radiolink", and "radio link" have the same meaning in the context of the invention.

As a matter of fact, trains are not always running with high speed. It slows down when it turns around or it's about to stop. This invention is focused on how to guarantee the communication quality of users with relative high-speed. So setting up the same cell (Cell_Fast) along the railways between two big railway stations is suitable, especially trains are only running in two directions along the railway—up or down.

Hereinafter, a normal cell is used to guarantee and serve relative low-speed UEs, and it allows the UEs to register into. A fast cell (also called Cell_Fast) is used to guarantee and serve relative high-speed UEs, and preferably it doesn't allow these UEs to register into but handover from normal cells. Alternatively, the UE may be specified to first register into the normal cell instead of the fast cell. In this way, the user registration in normal cell will not be affected by Cell_Fast. This will better improve the setup success rate of a service connection (such as a call, etc.)

Figure 2:
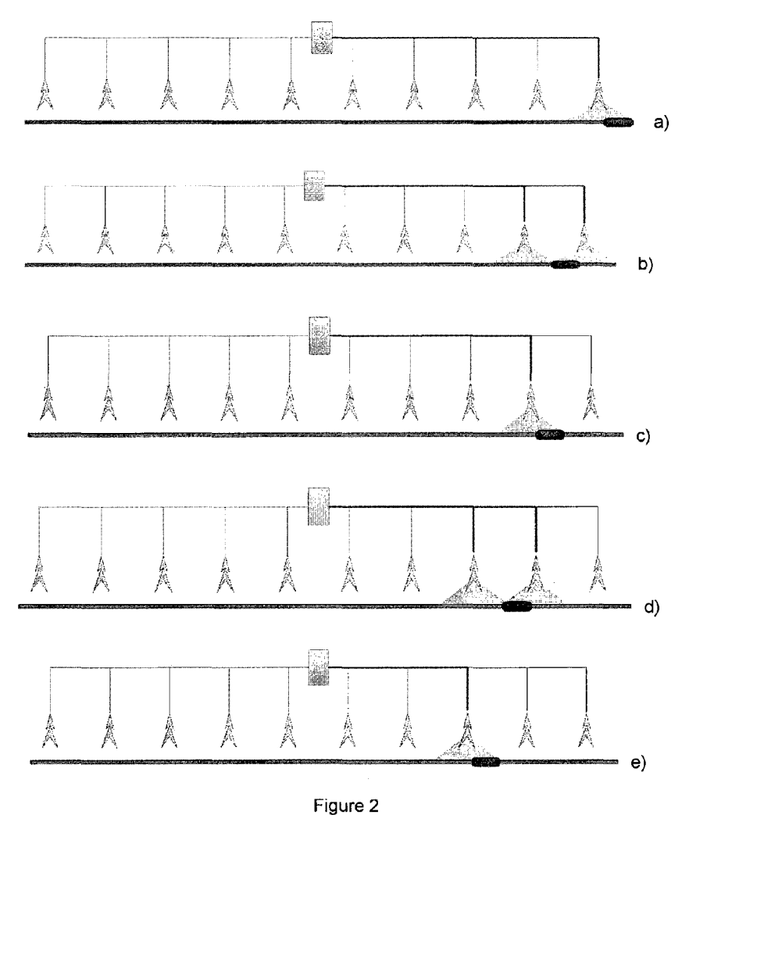
FIG. 2 illustrates a schematic diagram of a scenario according to an embodiment of the present invention.

FIG. 2 shows a schematic diagram of an implementation procedure of the methods according to embodiments of the present invention, where two solutions are proposed depending on different scenarios of the invention.

Figure 3:
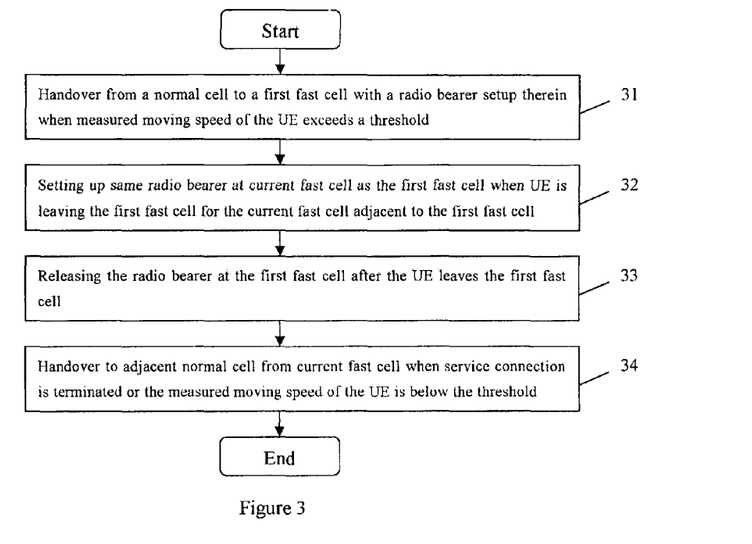
FIG. 3 illustrates a schematic diagram of a method for handover of UE in wireless communication according to an embodiment of the present invention.

In one of the solutions (i.e., Solution A) according to an embodiment of the present invention, dynamic configuration with radio bearers are implemented. In this case, in particular, Cell_Fasts are set up as BTS/NodeB/eNB starts up. Dynamic radiolink setup follows the moving of UE with relative high-speed. A service connection (for example, a call) is established via the UE. The service connection may be a call connection, a time-sensitive data service connection or a video service connection, etc. The solution includes the following steps, as shown in FIG. 3:

In step 31, when network side detects UE is moving very fast (in a relative high speed), the network side instructs the UE handover from a normal cell to the first Cell_Fast (at the Base Station 1, BS1) with a radio bearer set up therein. Preferably, the Cell_Fast will not allow UE to register but handover. Alternatively, the UE may be specified to first register into the normal cell instead of the Cell_Fast.

In step 32, if the network side detects that the UE is moving to the adjacent Cell_Fast at base station BS2 and will go out of the coverage of current Cell_Fast at BS1, then the network side instructs the adjacent base station BS2 to set up the same radio bearer as the first Cell_Fast at BS1.

The radio bearer usually includes frequency, scramble code, code resources, and transmission format.

Accordingly, the UE moves into the coverage of the Cell_Fast at the base station BS2.

In step 33, after the UE leaves the first Cell_Fast at BS1, the network side releases the radio bearer of the UE at BS1.

In step 34, when the call is terminated, the UE re-registers into a normal cell adjacent to the Cell_Fast at BS2, or when the UE speed slows down, the UE handovers to the adjacent normal cell from the Cell_Fast at BS2.

In this solution (i.e., solution A), processing is fast and implementation is easy, since Cell_Fast is preset (i.e., the Cell_Fast is set up once BTS/NodeB/eNB starts up), so the signaling processing time for moving within Cell_Fast is much less.

In a preferred embodiment of the present invention, when the UE is moving on from the current Cell_Fast to the adjacent subsequent Cell_Fast and the measured moving speed of the UE exceeds the threshold, the same radio bearer as the one set up at the current Cell_Fast is set up at the adjacent subsequent Cell_Fast; and correspondingly, the radio bearer at the current Cell_Fast is released after the UE leaves the current Cell_Fast. Since there is no L3 signalling and no signalling at the air interface, and no handover is needed, this will further significantly reduce the handover times of UE with high-speed.

Figure 4:
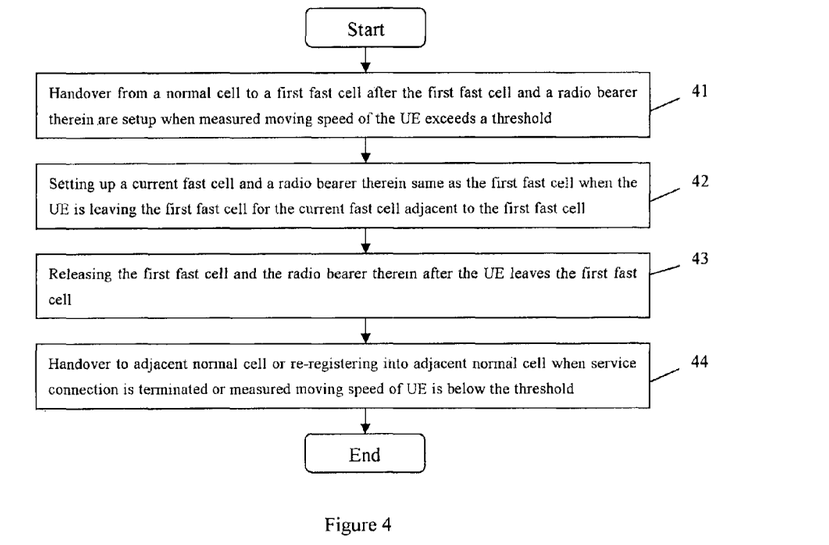
FIG. 4 illustrates a schematic diagram of a method for handover of in wireless communication according to another embodiment of the present invention.

In another solution (i.e., Solution B) according to another embodiment of the present invention, dynamic configuration with cells (i.e., Cell_Fasts) and radio bearers is implemented. In this case, in particular, Cell_Fast is not set up as BTS/NodeB/eNB starts up. Dynamic cell setup and radiolink setup follow the moving of UE with relative high-speed. The UE in a moving train initiates a service connection, such as a call connection in a normal cell. The solution includes, as shown in FIG. 4:

In step 41, when network side detects UE is moving very fast (in a relative high speed), the network side sets up a first cell (named first Cell_Fast) at BS1 and a radio link therein, and instructs the UE handover to the first Cell_Fast at BS1 from the normal cell. Preferably, the Cell_Fast will not allow UE to register into but handover. Alternatively, the UE may be specified to first register into the normal cell instead of the Cell_Fast.

In step 42, the network side dynamically sets up the same Cell_Fast and the radio link at base station BS2 as that in the first Cell_Fast at BS1 if the network side detects that UE is moving to a Cell_Fast at base station BS2 (the second Cell_Fast) and will go out of the coverage of current first Cell_Fast at BS1.

Accordingly, the UE moves into the coverage of the Cell_Fast at the base station BS2.

In step 43, after the UE leaves the first Cell_Fast at BS1, the network side releases the corresponding radio link at BS1, and when all the radio bearers are released in the first Cell_Fast, the first Cell_Fast is released.

In step 44, when the call is terminated, the UE re-registers into an adjacent normal cell; or when UE speed slows down, the UE handovers to the adjacent normal cell from the Cell_Fast at BS2.

In a preferred embodiment of the present invention, when the UE is moving on from the current Cell_Fast to the subsequent Cell_Fast and the measured moving speed of UE exceeds the threshold, a subsequent Cell_Fast and a radio bearer therein same as the current Cell_Fast is set up; and correspondingly, after the UE leaves the current Cell_Fast, the corresponding radio bearer is released; and when all the radio bearers are released in the current Cell_Fast, the current Cell_Fast is released. This will further significantly reduce the handover times of UE with high-speed.

In another embodiment of the present invention, hereinafter, as an example, solutions applied to different communication systems are described in detail. However, this is only used to exemplify the invention, and should not be seen as limiting the scope of the invention to only the aforementioned systems.

For solution A, dynamic configuration with radio bearer (radiolink) is implemented. Cell_Fast is set up as BTS/NodeB/eNB starts up. Dynamic radiolink setup follows high-speed UE moving. In particular, solution A is implemented by including following phases.

Solution A-phase 1: Handover into Cell_Fast or out of Cell_Fast

This phase is used to describe the behavior of UE and access network when UE handovers from a normal cell to a Cell_Fast or from a Cell_Fast to a normal cell. The moving speed of the UE is measured and/or reported periodically. Preferably, one new type measurement for UE moving speed is added at Abis (interface between BSC and BTS, for example, in GSM) and Iub (interface between Node B and RNC, for example, in WCDMA/TD-SCDMA) interface. For LTE no more measurement type is needed to distribute among eNB. But each eNB has its own parameter to check the moving speed of UE. In particular, For GSM:
a. Add one new type measurement in Abis interface for MS (i.e, UE) Moving Speed;
b. Steps for Handover into Cell_Fast:
BTS sends a Measurement Report from a source cell to BSC periodically as required; and
BSC instructs UE to handover into a target cell (the defined adjacent Cell_Fast) only if MS moving speed exceeds the threshold; and the threshold may be specified as any moving speed exceeding, e.g., 100 km/h.
c. Steps for Handover out of Cell_Fast:
BTS sends a Measurement Report from a source cell to BSC periodically as required; and
BSC instructs UE handover into a target cell (the defined adjacent normal cell) when MS moving speed becomes under the threshold.

For WCDMA/TD-SCDMA:
a. Add one new dedicated measurement in Iub Interface for UE Moving Speed;
b. Steps for Handover into Cell_Fast:
NodeB sends a Measurement Report from a source cell to RNC periodically as required; and
RNC instructs UE to handover into a target cell (the defined neighbour Cell_Fast) when UE moving speed exceeds the threshold; and the threshold may be specified as any moving speed exceeding, e.g., 100 km/h.
c. Steps for Handover out of Cell_Fast:
NodeB sends a Measurement Report from a source cell to RNC periodically as required; and
RNC instructs UE to handover into target cell (the defined neighbour normal cell) when UE moving speed becomes under the threshold.

For LTE:
In LTE, one eNB might need to handle more than one cell. When the handover from a normal cell to Cell_Fast happens in one eNB it triggers intra-eNB handover. When the handover from the normal cell to Cell_Fast happens between two eNB, it triggers inter-eNB handover.
a. For intra-eNB handover, all the implementation can be designed flexibly according to the basic concept of this invention. Processing is performed internally and easily; and
b. For inter-eNB handover, source eNB sends a Handover Request to target eNB via X2 or S1 interface just the same as existing LTE standards, thus omitted here for concise and simplicity.

Solution A-phase 2: Dynamic Moving within Cell_Fasts

This phase is used to describe the behavior of UE and access network when UE moving within Cell_Fast with relative high-speed. No handover is needed and there is no L3 signaling and no signaling at the air interface (e.g., Uu port).

Figure 5:
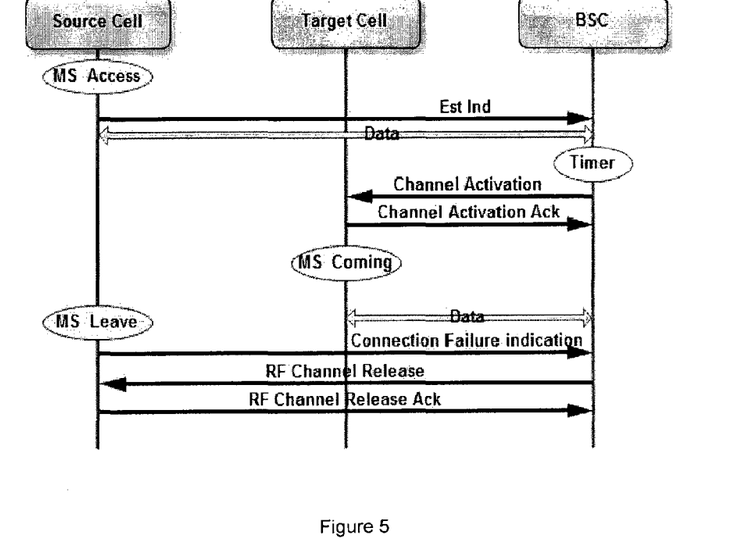
FIG. 5 illustrates a schematic diagram of signaling in GSM system for dynamically configuring radio bearers according to an embodiment of the present invention when UE is dynamically moving within Cell_Fast.

In this phase, for GSM, signaling exchange procedures, as shown in FIG. 5, are described as follows:
a. When a source cell detects UEs moving from adjacent Cell_Fast, it sends Est ind message to BSC;
b. The Source cell sends user plane data to the BSC, and BSC stores these data;
c. BSC starts a timer Tu to decide when to order the target cell to allocate the related resource; and the timer Tu can be decided by operators;
d. When the timer Tu is up, BSC sends a Channel Activation message to a target cell to allocate the related resource. When the related resource, such as the same radio bearer as the previous cell, is set up, the target cell sends a Channel Activation message to BSC;
e. When UE moves into the target cell, BSC routes the user plane data to the target cell;
f. When the source cell can not decode right uplink data, the source cell sends a message connection Failure indication to BSC;
g. Then BSC sends a message "RF channel Release" to the source cell to release the related resource; and
h. After the source cell releases the related resource, it sends RF Channel Release Ack to BSC.

Figure 6:
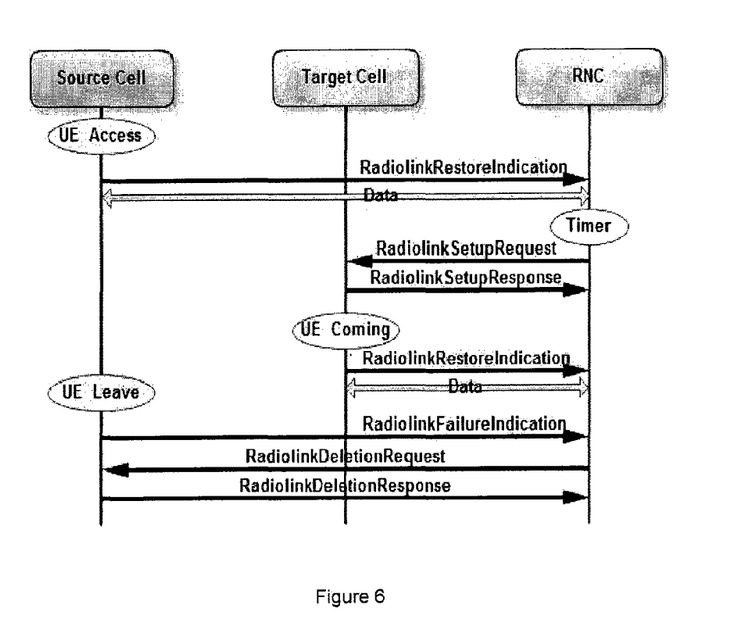
FIG. 6 illustrates a schematic diagram of signaling for dynamically configuring radio bearers in WCDMA or TD-SCDMA system according to an embodiment of the present invention when UE is moving within Cell_Fast.

For WCDMA, TD-SCDMA, signaling exchange procedures, as shown in FIG. 6, are described as follows:
a. When a source cell detects UEs moving from adjacent Cell_Fast, it sends a radiolink Restore Indication message to RNC;
b. The source cell sends user plane data to the RNC, and RNC stores these data;
c. RNC starts a timer Tu to decide when to order the target cell to allocate the related resource. The timer Tu is decided by the Operator;
d. When the timer Tu is up, RNC sends a message Radiolink Setup Request to a target cell to allocate the related resource. When the related resource, such as the same radio bearer as the previous cell, is set up, the target cell sends a Radiolink Setup Response message to RNC;
e. When UE moves into the target cell, RNC routes the user plane data to the target cell;
f. When the source cell can not decode uplink data correctly, the source cell sends a message Radiolink Failure Indication to RNC;
g. Then RNC sends a message Radiolink Deletion Request to the source cell to release the related resource; and
h. After the source cell releases the related resource, it sends a Radiolink Deletion Response message to RNC.

LTE supports Semi-Static Allocation for voice call or PS traffic during the relative high-speed moving. For LTE, one eNB might need to handle more than one cell. When the handover within Cell_Fast happens in one eNB it triggers intra-eNB handover. And when the handover within Cell_Fast happens between two eNB, it triggers inter-eNB handover.

During intra-eNB moving, all the implementation can be designed flexibly according to the basic concept of this invention. Processing is performed internally and easily.

Figure 7:
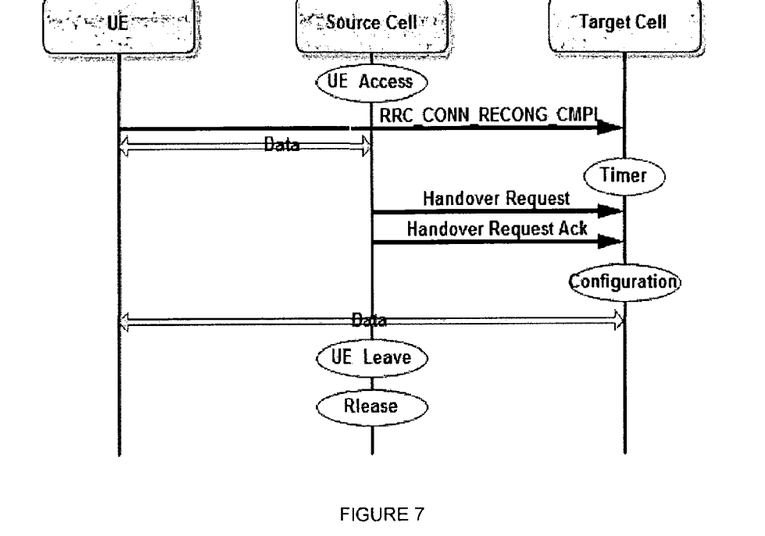
FIG. 7 illustrates a schematic diagram of signaling for dynamically configuring radio bearers in LTE system according to an embodiment of the present invention when UE is moving within Cell_Fast.

During inter-eNB moving, signaling exchange procedures, as shown in FIG. 7, are described as follows:
a. When a source cell detects UEs moving from adjacent Cell_Fast (i.e., the source cell receives RRC_CONN_RE-CONFG_CMPI);

b. The source cell starts a timer Tu to decide when to order the target cell to allocate the related resource. The timer Tu is decided by the Operator;

c. When the timer Tu is up, the source cell sends a message Handover Request to a target cell to allocate the related resource. When the related resource, such as the same radio bearer as the previous cell, is set up, the target cell sends a Handover Request ACK message to the source cell;

d. The source cell routes buffer packets to the target cell;

e. When UE comes into the target cell, the target cell communicates with the UE; and f. When the source cell can not decode right uplink data, the Source cell releases the related resource.

Solution A-phase 3: service connection released.

This is the same as the description of existing specifications, thus omitted here for concise and simplicity.

For solution B, dynamic configuration with Cells (Cell_Fasts) and radio links is implemented. The Cell_Fast is not set up as BTS/NodeB/eNB starts up.

Figure 8:
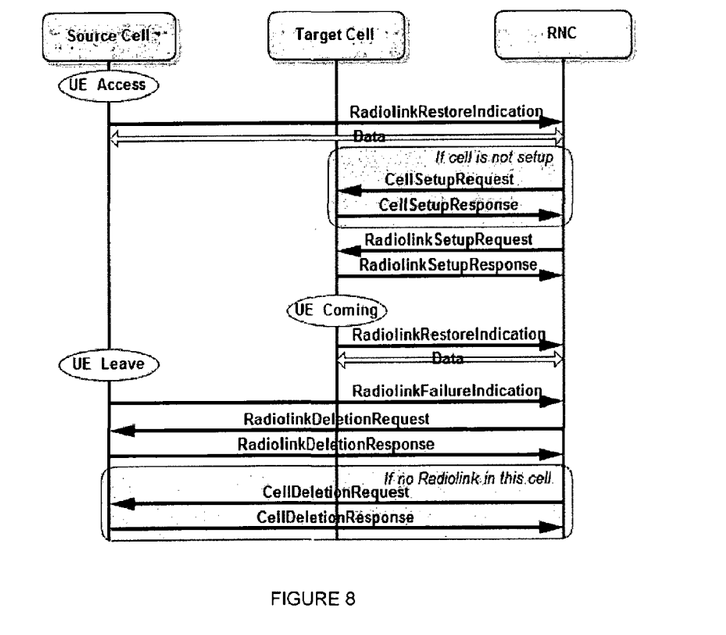
FIG. 8 illustrates a schematic diagram of signaling for dynamically configuring cells and radio links in WCDMA or TD-SCDMA system according to an embodiment of the present invention when UE is moving within Cell_Fast.

FIG. 8 illustrates a schematic diagram of signaling for dynamically configuring cells and radio links in WCDMA or TD-SCDMA system when UE is dynamically moving within Cell_Fast. In the embodiment, dynamic cell setup and radiolink setup follow relative high-speed UE moving. In other words, the target Cell_Fast and the radiolink are set up quickly once UE is coming. When the UE is leaving the target Cell_Fast, the corresponding radio link in the target Cell_Fast is released, and when no UEs exist in the target Cell_Fast, the target Cell_Fast is released. Except the above differences, other signaling procedures are almost the same as solution A illustrated above.

For solution B, since Cell_Fast needs not to be preset (i.e., set up as BTS/NodeB/eNB starts up), compared to solution A, the processing time for cell setup is to be considered.

Figure 9:
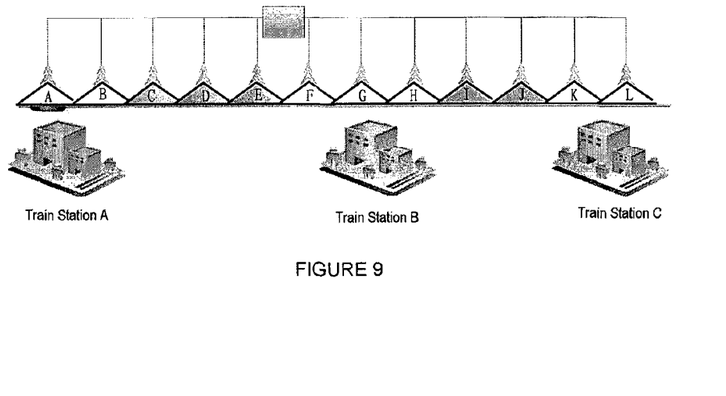
FIG. 9 illustrates a schematic diagram of an application scenario according to an embodiment of the present invention.

Hereinafter, an application example as shown in FIG. 9 for WCDMA/TD-SCDMA is provided according to an embodiment of the invention.

The application scenario is as follows: Jack is making a call in the train moving from Train Station A to Train Station C via Train Station B. The call is triggered when the train is starting off from Train Station A with slow speed. UE moving is speeding up while the train speed is accelerated. The call lasts for a long time during which the train stops at Train Station B for 10 min, and the call hands off several miles before Train Station C.

In the network, assume:

a. The base stations between two big train stations are controlled by one RNC. So there shall have two RNCs, one is used to control base stations from Train Station A to Train Station B while the other one is used to control base stations from Train Station B to Train Station C as an example, only one RNC is illustrated in FIG. 9;

b. For simplicity, it assumes there are five base stations radio coverage (for example, cells B, C, D, E, F) between Train Station A and Train Station B train stations while there are four base stations radio coverage (for example, cells H, I, J, K) between Train Station B and Train Station C train stations.

c. The hollow base stations radio coverage near Train Station A, Train Station B and Train Station C (for example, normal cells A, B, F, G, H, K, L) are used by individual cells with different scrambling code.

d. The shaded base stations radio coverage (for example C, D, E, I, J) between Train Station A and Train Station B or between Train Station B and Train Station C may preferably shared by two kinds of cells. That is, the coverage (for example, the coverage C) may include a normal cell serving the UEs with relative low-speed and a Cell_Fast serving the UEs with relative high-speed. The coverage of the normal cell and the Cell_Fast may be the same or different. Preferably, the Cell_Fasts between two big Stations (for example, Train Station A and B) may have the same scrambling code. That's to say three shaded radio coverage between Train Station A and Train Station B consist of Cell_Fasts with the same scrambling code (SC1) while two shaded radio coverage between Train Station B and Train Station C consist of Cell_Fasts with another same scrambling code (SC2).

e. Cell_Fast only serves the relative high-speed UE, while the normal cell serves the relative low-speed UE.

As an example of solution A, dynamic configuration with radio bearer (radiolink) is implemented. For UE moving from cell A to cell B, from cell F to cell H, and from cell K to cell L, the handover is performed between normal cells as in the prior art, thus will not be described here any more.

First, UE with high-speed handovers from a normal cell B into Cell_Fast C.

In particular, NodeB at a source cell B sends a Measurement Report from the source cell to RNC periodically as required; when RNC finds that the Moving speed of UE exceeds the threshold (defined by the Operator), RNC orders the UE to handover from source cell B into a target cell (the defined neighbour Cell_Fast C) with a radiolink set up therein.

Subsequently, UE is dynamically moving within Cell_Fast (i.e. cells C, D, E).

In this phase, UE handovers to the Cell_Fast C. RNC continues to receive the Measurement Report from the NodeB at the Cell_Fast C as the source cell, if RNC finds UE keeps moving in a relative high-speed exceeding the threshold towards a target Cell_Fast D, it dynamically sets up a same radiolink at Cell_Fast D as Cell_Fast C. When the NodeB at the source Cell_Fast C can not decode the signal of UE successfully, it sends a message Radiolink Failure Indication to RNC, and RNC sends a message Radiolink Deletion Request to the source Cell_Fast C to release the related resource therein.

As such, when UE keeps moving in a relative high-speed exceeding the threshold from Cell_Fast D towards a target Cell_Fast E, RNC dynamically sets up a same radiolink at Cell_Fast E as the source cell (i.e., Cell_Fast D). Subsequently, if the NodeB at the source Cell_Fast D can not decode the signal of UE successfully, it sends a message Radiolink Failure Indication to RNC, and RNC sends a message Radiolink Deletion Request to the source Cell_Fast D to release the related resource therein.

It is appreciated easily that there are no handover operation required among the Cell_Fast C, D, E, thus the handover times of the UE is reduced significantly. As a result, quality of wireless communication of UE with relative high-speed can be better guaranteed and user will have a good experience in communication since frequent handover is avoided during UE high-speed moving.

In the end, UE with relative high-speed handovers out of Cell_Fast E and moves into a normal cell F.

The UE slows down when it is getting into a new train station. NodeB at the source cell (e.g., Cell_Fast E) sends a Measurement Report from the source cell to RNC periodically as required; when RNC finds that the Moving speed of UE is below the threshold, it orders the UE to handover from the source Cell_Fast E into a target cell (the defined neighbour normal cell F).

After that, the process between Train Station B and Train Station C (including phase for handover from normal cell H to Cell_Fast I, phase for UE moving within Cell_Fasts I and J, and phase for handover from Cell_Fast J to normal cell K) will repeat the previous phases as described above (including phase for handover from normal cell B to Cell_Fast C, phase for UE moving within Cell_Fasts C, D and E, and phase for handover from Cell_Fast E to normal cell F), thus will not be described again.

In this example, the call hands off several miles before Train Station C.

As an example of solution B, dynamic configuration with cells (Cell_Fasts) and radio links is implemented. In this example, Cell_Fast is not set up as BTS/NodeB/eNB starts up. Dynamic Cell setup and radiolink setup follow relative high-speed UE moving.

The example of solution B is similar to the example of solution A except that RNC needs to set up Cell_Fast before set up radiolink while release Cell_Fast after release all the radiolinks in the Cell_Fast. Thus, the process will not be described again here for concise and simplicity.

In the embodiments of the present invention, the high-speed handover times are reduced significantly since there is no handover operation between Cell_Fasts where UE is moving in a relative high-speed exceeding a threshold defined by the Operator; as a result, the quality of wireless communication of UE with relative high-speed can be better guaranteed and user will have a good experience in communication since frequent high-speed handover may be avoided during UE high-speed moving. Meanwhile, with the solutions in the present invention, average capacity and spectrum efficiency of per square meter is higher than the prior art. Further, network expansion is convenient since no reinstallation of hardware of base stations is needed, thus improving largely the Operator's investment efficiency.

Figure 10:
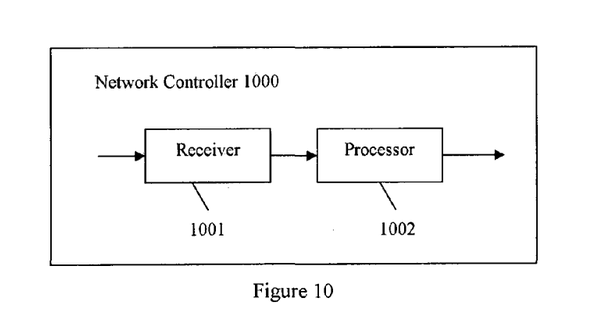
FIG. 10 illustrates a schematic diagram of a network controller for handover of UE in wireless communication according to another embodiment of the present invention.

FIG. 10 illustrates a schematic diagram of a network controller 1000 for handover of UE with high-speed mobility in wireless communication according to another embodiment of the present invention.

The network controller 1000 is configured for handover of UE in wireless communication network, which may be BSC in GSM network or RNC in WCDMA, TD-SCDMA network, for example. The network controller 1000 communicates with a base station 2000 to accomplish the handover of UE. The base station 2000 may be BTS in GSM network or NodeB in WCDMA, TD-SCDMA network, for example. For LTE network, the network controller 1000 and the base station 2000 may be combined into one eNB device.

The network controller 1000 includes: a receiver 1001 and a processor 1002. The receiver 1001 is configured to receive information of UE moving speed measured from the base station. The processor 1002 is configured to, if fast cells are set up as base stations starts up, instruct to: handover from a normal cell to a first fast cell with a radio bearer set up therein when the UE moving speed exceeds a threshold, set up a same radio bearer at a current fast cell as the first fast cell when the UE is leaving the first fast cell for the current fast cell adjacent to the first fast cell, release the radio bearer at the first fast cell after the UE leaves the first fast cell, and re-registering into an adjacent normal cell when the service connection is terminated, or handover to an adjacent normal cell from the current fast cell when the measured moving speed of the UE is below the threshold; otherwise, if fast cells are not set up as base stations starts up, the processor adapted to follow the same procedures as above except set up the fast cell before set up the radio bearer, and release the fast cell after release all the radio bearers in the fast cell.

The fast cells are cells configured for UEs with the moving speed exceeding the threshold.

Figure 11:
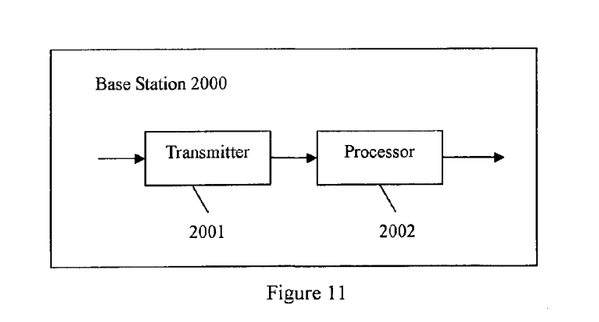
FIG. 11 illustrates a schematic diagram of a base station for handover of UE in wireless communication according to another embodiment of the present invention.

FIG. 11 illustrates a schematic diagram of a base station for handover of UE with high-speed mobility in wireless communication according to another embodiment of the present invention.

The base station 2000 is configured to monitor and report information of UE moving speed periodically to the network controller 1000 and coordinate with the network controller 1000 for handover of UE in wireless communication network. The base station 2000 may be BTS in GSM network or NodeB in WCDMA, TD-SCDMA network, for example. For LTE network, the network controller 1000 and the base station 2000 may be combined into one eNB device.

The base station 2000 includes: a transmitter 2001 and a processor 2002. The transmitter is configured to measure and transmit information of UE moving speed periodically; and the processor 2002 is configured to: in case that fast cells are set up as base stations starts up, set up a same radio bearer at a current fast cell as a first fast cell when the UE is leaving the first fast cell for the current fast cell adjacent to the first fast cell and the measured moving speed exceeding a threshold, and release the radio bearer at the first fast cell after the UE leaves the first fast cell; otherwise, the processor adapted to follow the same procedures as above except set up the fast cell before set up the radio bearer, and release the fast cell after release the radio bearer.

The fast cells are cells configured for UEs with the moving speed exceeding the threshold.

The present invention also provides a system for handover of UE in wireless communication system. The system includes at least a UE, the network controller 1000 and the base station 2000 according to the embodiments of the present invention The unit(s) or module(s) comprised in the device/apparatus according to some embodiments may be any unit normally used for performing the involved tasks, e.g., a hardware, such as a processor with a memory.

The invention may be implemented in any suitable form including hardware, software, firmware or any combination thereof. Specifically, the invention may be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

The terminology used herein is for the purpose of describing particular embodiments only and is not intended to limit to the invention. As used herein, the singular forms "a", "an" and "the" are intended to include the plural forms as well, unless otherwise stated. It will be further understood that the terms "comprising", "including" and conjugation thereof when used herein, specify the presence of stated features, integers, steps, operations, elements, and/or components, but do not preclude the presence or addition of one or more other features, integers, steps, operations, elements, components, and/or groups thereof.

Although the present invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for handover of a User Equipment (UE) in a wireless communication network, a service connection being made via the UE, comprising:
    handing over the UE from a normal cell to a first fast cell with a radio bearer set up therein when a measured moving speed of the UE exceeds a threshold;
    setting up, at a base station, a same radio bearer at a second fast cell as the radio bearer sets up at the first fast cell when the UE is leaving the first fast cell for the second fast cell adjacent to the first fast cell;
    releasing the radio bearer at the first fast cell after the UE leaves the first fast cell; and
    re-registering, at the base station, the UE into an adjacent normal cell when the service connection is terminated, or
    handing over the UE to the adjacent normal cell from the second fast cell when the measured moving speed of the UE is below the threshold,
    wherein the normal cells and the fast cells are established as network side starts up, the fast cells being cells configured along a railway.

2. The method according to claim 1, further comprising:
    setting up the same radio bearer at an adjacent subsequent fast cell as the second fast cell when the UE is moving on from the second fast cell to the adjacent subsequent fast cell and the measured moving speed of the UE exceeds the threshold; and
    releasing correspondingly the radio bearer at the second fast cell after the UE leaves the second fast cell.

3. The method according to claim 1, wherein the fast cells have a same scrambling code.

4. The method according to claim 1, wherein the first fast cell does not allow the UE to register but allow handover.

5. The method according to claim 1, wherein the measured moving speed of the UE is measured by a base station periodically.

6. The method according to claim 5, wherein the measured moving speed of the UE is reported to a base station subsystem (BSC) or radio network controller (RNC) via corresponding Abis or Iub interface.

7. A method for handover of a User Equipment (UE) in a wireless communication network, a service connection being made via the UE, comprising:
    handing over the UE from a normal cell to a first fast cell after the first fast cell and a radio bearer therein are set up when a measured moving speed of the UE exceeds a threshold;
    setting up, at a base station, a second fast cell and a radio bearer therein same as the first fast cell when the UE is leaving the first fast cell for the second fast cell adjacent to the first fast cell;
    releasing the radio bearer of the UE in the first fast cell after the UE leaves the first fast cell, and releasing the first fast cell if all the radio bearers are released in the first fast cell; and
    re-registering, at the base station, the UE into an adjacent normal cell when the service connection is terminated, or
    handing over the UE to the adjacent normal cell from the second fast cell when the measured moving speed of the UE is below the threshold, wherein fast cells are cells configured along a railway.

8. The method according to claim 7, further comprising:
    setting up a subsequent fast cell and a radio bearer therein same as the second fast cell when the UE is moving on from the second fast cell to the subsequent fast cell and the measured moving speed of the UE exceeds the threshold; and
    releasing the radio bearer of the UE in the second fast cell after the UE leaves the second fast cell, and releasing the second fast cell if all the radio bearers are released in the second fast cell.

9. The method according to claim 7, wherein the fast cells have a same scrambling code.

10. The method according to claim 7, wherein the first fast cell does not allow the UE to register but allow handover.

11. The method according to claim 7, wherein the measured moving speed of the UE is measured by a base station periodically.

12. The method according to claim 11, wherein the measured moving speed of the UE is reported to a base station subsystem (BSC) or radio network controller (RNC) via corresponding Abis or Iub interface.

13. A network controller for handover of a User Equipment (UE) in a wireless communication network, a service connection being made via the UE, comprising:
    a receiver adapted to receive information of a measured UE moving speed; and
    a processor adapted to,
        if fast cells are set up as base stations starts up, instruct to hand over the UE from a normal cell to a first fast cell with a radio bearer set up therein when the measured UE moving speed exceeds a threshold, set up a same radio bearer at a second fast cell as the radio bearer sets at the first fast cell when the UE is leaving the first fast cell for the second fast cell adjacent to the first fast cell, release the radio bearer at the first fast cell after the UE leaves the first fast cell, and re-register the UE into an adjacent normal cell when the service connection is terminated, or hand over the UE to the adjacent normal cell from the second fast cell when the measured moving speed of the UE is below the threshold; and
        if fast cells are not set up as base stations starts up, the processor adapted to follow the same procedures as above except setting up the first fast cell or the second fast cell before setting up a corresponding radio bearer in the first or the second fast cell, and releasing the first or the second fast cell after releasing all the radio bearers in the first or the second fast cell,
    wherein the fast cells are cells configured along a railway.

14. A base station for handover of a User Equipment (UE) in a wireless communication network, a service connection being made via the UE, comprising:
    a transmitter adapted to measure and transmit information of a UE moving speed periodically; and
    a processor adapted to,
        if fast cells are set up as base stations starts up, set up a same radio bearer at a second fast cell as the radio bearer sets up at a first fast cell when the UE is leaving the first fast cell for the second fast cell adjacent to the first fast cell and a measured moving speed is exceeding a threshold, and release the radio bearer at the first fast cell after the UE leaves the first fast cell;
        if fast cells are not set up as base stations starts up, the processor adapted to follow the same procedures as above except setting up the first or the second fast cell before setting up a corresponding radio bearer in the first or the second fast cell, and releasing the first or the second fast cell after releasing all the radio bearer in the first or the second fast cell,
wherein the fast cells are cells configured along a railway.

15. A system for handover of User Equipment (UE) in a wireless communication system, comprising:
a UE;
a network controller including:
a receiver adapted to receive information of a measured UE moving speed; and
a network controller processor adapted to,
if fast cells are set up as base stations starts up, instruct to handover the UE from a normal cell to a first fast cell with a radio bearer set up therein when the measured UE moving speed exceeds a threshold, set up a same radio bearer at a second fast cell as the radio bearer sets up at the first fast cell when the UE is leaving the first fast cell for the second fast cell adjacent to the first fast cell, release the radio bearer at the first fast cell after the UE leaves the first fast cell, and re-register the UE into an adjacent normal cell when a service connection is terminated, or hand over the UE to the adjacent normal cell from the second fast cell when the measured moving speed of the UE is below the threshold; and
if fast cells are not set up as base stations starts up, the processor adapted to follow the same procedures as above except setting up the first fast cell or the second fast cell before setting up a corresponding radio bearer in the first or the second fast cell, and releasing the first or the second fast cell after releasing all the radio bearers in the first or the second fast cell,
wherein the fast cells are cells configured along a railway; and
a base station including:
a transmitter adapted to measure and transmit information of the UE moving speed periodically;
a base station processor adapted to,
if fast cells are set up as base stations starts up, set up a same radio bearer at the second fast cell as the radio bearer sets up at a first fast cell when the UE is leaving the first fast cell for the second fast cell adjacent to the first fast cell and the measured moving speed is exceeding a threshold, and release the radio bearer at the first fast cell after the UE leaves the first fast cell;
if fast cells are not set up as base stations starts up, the processor adapted to follow the same procedures as above except setting up the first or the second fast cell before setting up the corresponding radio bearer in the first or the second fast cell, and releasing the first or the second fast cell after releasing all the radio bearer in the first or the second fast cell.

16. The network controller according to claim 13, wherein the processor further adapted to:
set up the same radio bearer at an adjacent subsequent fast cell as the second fast cell when the UE is moving on from the second fast cell to the adjacent subsequent fast cell and the measured moving speed of the UE exceeds the threshold; and
release correspondingly the radio bearer at the second fast cell after the UE leaves the second fast cell.

17. The network controller according to claim 13, wherein the fast cells have a same scrambling code.

18. The network controller according to claim 13, wherein the first fast cell does not allow the UE to register but allow handover.

19. The network controller according to claim 13, wherein the measured moving speed of the UE is measured by a base station periodically.

20. The network controller according to claim 19, wherein the measured moving speed of the UE is reported to a base station subsystem (BSC) or radio network controller (RNC) via corresponding Abis or Iub interface.

* * * * *

UNITED STATES PATENT AND TRADEMARK OFFICE
CERTIFICATE OF CORRECTION

PATENT NO. : 9,179,388 B2
APPLICATION NO. : 13/979835
DATED : November 3, 2015
INVENTOR(S) : Yu et al.

It is certified that error appears in the above-identified patent and that said Letters Patent is hereby corrected as shown below:

In the specification:

In Column 5, Line 35, delete "etc.)" and insert -- etc.). --, therefor.

In Column 12, Line 32, delete "invention" and insert -- invention. --, therefor.

In the claims:

In Column 14, Line 33, in Claim 13, delete "sets" and insert -- sets up --, therefor.

Signed and Sealed this
Fifth Day of April, 2016

Michelle K. Lee
*Director of the United States Patent and Trademark Office*